No. 12,337. REISSUED APR. 11, 1905.

W. F. J. LUTZ.

CONNECTION FOR SEWER AND SOIL PIPES.

APPLICATION FILED AUG. 25, 1904.

Witnesses:
H. G. Barrett.
W. Hall.

Inventor:
William F. J. Lutz.
by Robert Brown
his Atty's.

PHOTO-LITHOGRAPHED AT SACHETT & WILHELMS LITHO. & PTG. CO. NEW YORK.

No. 12,337. Reissued April 11, 1905.

UNITED STATES PATENT OFFICE.

WILLIAM FRED JOHN LUTZ, OF CHICAGO, ILLINOIS.

CONNECTION FOR SEWER AND SOIL PIPES.

SPECIFICATION forming part of Reissued Letters Patent No. 12,337, dated April 11, 1905.

Original No. 763,298, dated June 21, 1904. Application for reissue filed August 25, 1904. Serial No. 222,186.

*To all whom it may concern:*

Be it known that I, WILLIAM FRED JOHN LUTZ, a citizen of the United States, and a resident of Chicago, in the county of Cook and State of Illinois, have invented certain new and useful Improvements in Connections for Sewer and Soil Pipes; and I do hereby declare that the following is a full, clear, and exact description thereof, reference being had to the accompanying drawings, and to the letters of reference marked thereon, which form a part of this specification.

This invention relates to improvements in connection or joints between the soil-pipes of buildings and sewer pipes or branches leading to outside sewers; and the object of the invention is to provide a simple, clean, compact, and reliable joint of this character which will prevent the escape of gas from the sewer past the soil-pipe into the building and at the same time permit the soil-pipe to shift slightly with respect to the sewer-pipe to such extent as will permit it to settle with the building in which the soil-pipe is located without impairing the joint or connection.

The invention consists in the matters hereinafter set forth, and more particularly pointed out in the appended claims.

Figure 1:
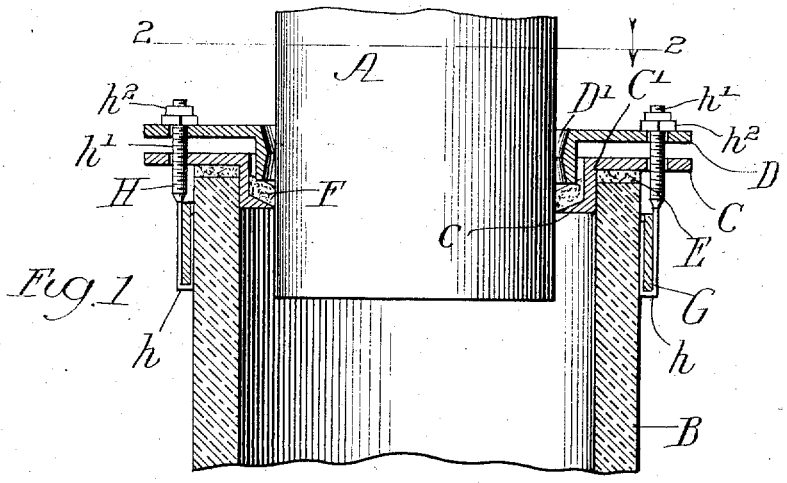
Figure 2:
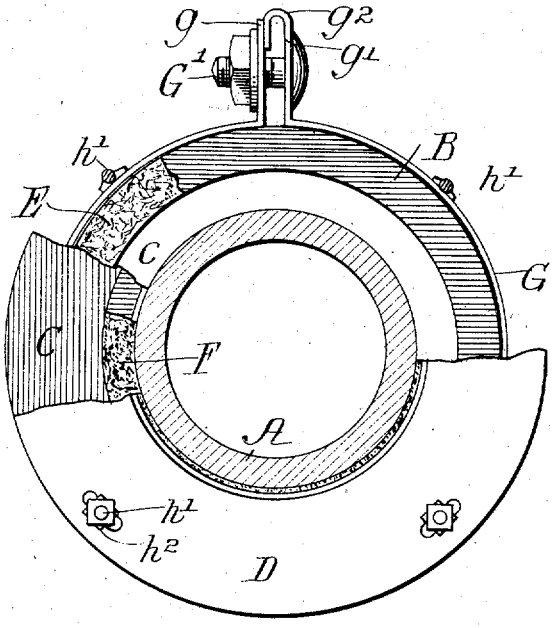
Figure 3:
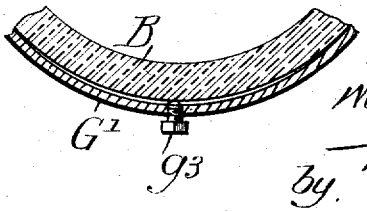

In the drawings, Figure 1 is a vertical section of the adjacent ends of a soil and sewer pipe, showing my improved joint for connecting the same. Fig. 2 is a view, partially in plan section, as taken on line 2 2 of Fig. 1, with parts broken away to show the same in plan in different horizontal planes. Fig. 3 is a fragmentary transverse section taken through the sewer-pipe and another form of attaching-band.

As shown in said drawings, A designates the lower end of a soil-pipe, and B the upper or adjacent end of a plain-ended sewer-pipe into which the soil-pipe drains. Said soil-pipe is made smaller than the sewer-pipe and extends a distance thereinto, as shown in Fig. 1.

My improved joint or connection for connecting the soil-pipe with the sewer-pipe is made as follows:

C designates a flat horizontal ring-like member or plate which fits over the upper end of the sewer-pipe and extends at its outer margins beyond the circumference of the sewer-pipe. Said ring C is provided at its inner margin with a depending annular flange C′, which is preferably made of such diameter as to fit snugly within the upper end of the sewer-pipe. Said annular flange C′ is in turn provided on its lower margin with an annular inturned flange *c*, which is preferably tapered on its upper surface and constitutes a seat for a packing-gasket, as will hereinafter more fully appear. D designates a second flat ring-like member or plate located horizontally over the ring C and provided on its inner margin with an annular depending flange D′, which fits within the annular depending flange of the ring C. The central opening of the ring D is made of sufficient diameter to easily receive the soil-pipe A. Interposed between the flat part of the ring C and the upper end margin of the soil-pipe D is an annular packing-gasket E, made of fiber or other suitable substance and which is compressed by forcing of said ring toward the sewer-pipe to prevent the escape of gas between said ring C and said sewer-pipe. A second similar gasket F is located within the annular flange C′ of said ring C and is compressed between the annular seat afforded by the horizontal flange *c* of said annular flange and the inner margin of the depending annular flange D′ of the ring D. By reason of the inclination of said annular seat the gasket F when compressed is forced radially inwardly against the exterior cylindric face of the soil-pipe, whereby escape of gas from the sewer between the ring C and soil-pipe is prevented. Instead of using fibrous gaskets I may in some instances employ tin-foil or other soft metal, thus producing a metallic joint. Said rings C and D are attached to and forced toward the sewer-pipe B, and the packing-gaskets E F are compressed between the parts by which they are confined by the following devices.

G designates a metal band which encircles the sewer-pipe a distance below the upper end thereof and possesses some resiliency. Said band is clamped around the sewer-pipe by means of a clamping-bolt G′, which extends through parallel lugs $g$ $g'$, extending laterally from the ends of said band. In order to localize the clamping effect of the bolt G′ at the inner ends of said lugs, so as to pull the ends of the band together instead of pressing the outer ends of the lugs together, said outer ends of the lugs are separated by an interposed part which prevents the same collapsing at their outer ends. As herein shown, the lug $g'$ is turned inwardly upon itself, so as to constitute an abutment $g^2$, which bears against the inner face of the lug $g$, whereby the outer ends of the lugs are not forced together by the clamping effect of the bolt; but such clamping force is exerted at the base of the lugs to pull the ends of the band together. Obviously such abutment may be otherwise formed, as, for instance, a block may be interposed between said lugs.

H H designates a plurality of bolts which are provided at their outer ends with hooks $h$, which hook under the band G, and the shanks $h'$ of said bolts extend upwardly through alined openings in the flat parts of the rings C D radially outside of the circumference of the sewer-pipe and are provided with nuts $h^2$, whereby said rings are forced downwardly toward the sewer-pipe, and the gaskets E F are compressed between the lower ring C and the sewer-pipe and between the two rings D C, respectively. The apertures in said packing-rings, through which the bolts H extend, are preferably elongated, so as to avoid extreme care and accuracy in fitting or assembling the parts. It will be observed that the bolts H are free to be shifted circumferentially of the band and sewer-pipe before the band is tightened, so that said hooks may be adjusted to packing-rings C and D, having variously-located apertures. After said hooks have been properly located with respect to the apertures of the clamping-rings the band G is clamped in place and thereafter prevents the bolts from shifting. The band G is made of such flexibility that it engages the sewer-pipe B between the hooks of the several bolts, so as to have frictional contact with said pipe and the bolts throughout practically the entire circumference of the band. By reason of the flexibility of the band and of the peculiar formation of the clamping-lugs $g$ $g'$ said band may be clamped about the pipe so tightly as to prevent the same from being pulled upwardly or toward the end of the sewer-pipe when the nuts $h^2$ of the clamping-bolts H are turned downwardly in place to force the rings C D into place and to compress the gaskets E and F.

It will be observed that both packing-rings C and D are forced downwardly into place by the same set of clamping-bolts H and that the gaskets, which form gas-tight joints between the lower ring C and sewer-pipe and between the said ring C and the soil-pipe, are both compressed at the same time and by the use of the same bolts H. This construction greatly simplifies the joint, both with respect to its manufacture and the operation of assembling the parts and removing the same, as there are few parts and the manner in which they are assembled renders it easy to maintain in proper order or repair. So far as concerns the coöperation of the rings C and D they may be attached to the sewer-pipe by other means than herein shown, and the single set of bolts by which the parts are held in their operative positions and by which both or all the packings are simultaneously pressed between the pipes and the rings, which is a distinctive feature of the invention, may be otherwise arranged and made to coöperate in different ways with the rings.

Another advantage arising from my improved joint is that the end of the sewer-pipe is entirely closed, so that there are no receptacles or pockets in the joint which are liable to collect dirt, vermin, or the like, and therefore become obnoxious by reason of the decaying of such dirt or vermin. On the other hand, all parts of the joints may be readily reached and kept in a cleanly condition.

In Fig. 3 the band G′ is shown as affixed to the sewer-pipe by means of screws $g^3$, tapped through the band and having pointed ends which are forced into the surface of the pipe, whereby the band is held in place on the pipe. In this construction the band will constitute a complete circle, which is slipped over the pipe and subsequently fastened to the pipe in the manner stated.

Other structural details or the form of the connection and the manner of its attachment to the sewer-pipe and the interconnection of the several parts thereof may be varied without departing from the spirit of my invention, and I do not wish to be limited thereto except as hereinafter made the subject of specific claims.

I claim as my invention—

1. The combination with a sewer-pipe and a soil-pipe, which enters the same, of a joint or connection for said pipes comprising an upper and lower ring fitted over the end of the sewer-pipe and apertured to receive the soil-pipe, the lower one of said rings being provided with an annular flange around the soil-pipe to receive a packing which is adapted to be pressed by a part on the upper ring to force said packing against said pipe, a packing between the lower ring and the sewer-pipe, and a single set of bolts for connecting the parts with the sewer-pipe and for clamping said packing against said pipes.

2. The combination with a sewer-pipe and a soil-pipe, which enters the same, of a joint or connection for said pipes comprising an upper and lower ring fitted over the end of the sewer-pipe and apertured to receive the soil-pipe, the lower one of said rings being provided with an annular flange which enters the sewer-pipe, and the other with an annular flange which enters the flange of the first ring, a gasket between the lower ring and the sewer-pipe, a second gasket between said two rings and bearing against the exterior surface of the soil-pipe, and a single set of bolts attached to the sewer-pipe and extending through alined apertures in said rings, and provided at their outer ends with nuts.

3. The combination with a sewer-pipe and a soil-pipe which enters the same, of a joint or connection for said pipes comprising an upper and lower ring fitted over the end of the sewer-pipe and apertured to receive the soil-pipe, the lower one of said rings being provided with an annular flange which enters the sewer-pipe, and the other with an annular flange which enters the flange of the first ring, a gasket between the lower ring and the sewer-pipe, a second gasket between said two rings and bearing against the exterior surface of the soil-pipe, a band encircling said soil-pipe and clamped thereto, and a plurality of bolts attached to said band and extending through alined openings in said rings and provided at their outer ends with clamping-nuts.

4. The combination with a sewer-pipe and a soil-pipe which enters the same, of a joint or connection for said pipe comprising two flat, generally parallel rings, made of greater diameter than the sewer-pipe, and apertured to receive the soil-pipe, the lower one of which is provided with a flange which enters the pipe, and the upper one with a flange which enters the flange of the first ring, a packing-ring between the lower ring and the end margin of the sewer-pipe, a second packing-gasket between said two rings and bearing against the exterior surface of the soil-pipe, and a single set of bolts for clamping said rings upon the pipe and together, and for compressing said gaskets, said rings entirely closing the end of the sewer-pipe and being free from overhanging pockets or recesses.

5. In a joint or connection between a sewer-pipe and a soil-pipe, the connection with suitable clamping members and gaskets surrounding the soil-pipe and closing the end of the sewer-pipe around the soil-pipe, of a metal band encircling said sewer-pipe and provided at its ends with parallel, laterally-extending lugs, a clamping-bolt extending through said lugs, a part interposed between said lugs laterally outside the bolt and a plurality of bolts attached to said band and extending upwardly through openings in said clamping members and provided at their upper ends with nuts.

6. In a joint or connection between a soil and a sewer pipe, the combination with suitable clamping members and gaskets surrounding the soil-pipe and closing the end of the sewer-pipe around the soil-pipe, of a metal band encircling the sewer-pipe and formed at its end to constitute parallel, laterally-extending lugs, the free end of one of said lugs being folded inwardly upon itself to engage the inner face of the other lug, a clamping-bolt extending through said lugs, and bolts attached to said band and extending upwardly through openings in said clamping members and provided at their outer ends with clamping-nuts.

In testimony that I claim the foregoing as my invention I affix my signature, in presence of two witnesses, this 12th day of August, A. D. 1904.

WILLIAM FRED JOHN LUTZ.

Witnesses:
WILLIAM L. HALL,
GEORGE RAYMOND WILKINS.